United States Patent Office 3,188,829
Patented June 15, 1965

3,188,829
CONDITIONING APPARATUS
Herbert G. Siewert, Manlius, and Stanley F. Gilman, Fayetteville, N.Y., assignors to Carrier Corporation, Syracuse, N.Y., a corporation of Delaware
Filed Mar. 12, 1964, Ser. No. 351,387
16 Claims. (Cl. 62—160)

This invention relates to refrigeration apparatus, and more particularly to a new and improved refrigeration apparatus including means for heating water.

Refrigeration apparatus serves as a means for interchanging energy in the form of heat between the area being conditioned and the ambient. Where the refrigeration apparatus is used for cooling, the apparatus extracts heat from the area being conditioned and rejects that heat to the ambient. Where the refrigeration apparatus is of the reverse cycle type capable of either cooling or heating operation, the apparatus, during heating cycle operation, extracts heat from the ambient and rejects that heat to the area being conditioned.

The interchange of energy effected between the area being conditioned and the ambient by the refrigeration apparatus frequently results in waste or dissipation of otherwise useful energy into the ambient, particularly where the refrigeration apparatus operates to cool the area being conditioned. While this dissipation of otherwise useful energy into the ambient by the refrigeration apparatus is recognized by those skilled in the art, prior art attempts at a practical arrangement for recovering at least a portion of this otherwise useful energy have been generally unsuccessful.

It is the principal object of the present invention to provide an improved refrigeration apparatus for effectively utilizing energy heretofore dissipated during operation of the refrigeration apparatus.

It is an additional object of the present invention to provide a refrigeration system in which energy heretofore dissipated during operation is employed to heat water.

It is a further object of the present invention to provide a combined refrigeration-water heating apparatus incorporating a novel control arrangement for insuring effective operation of the refrigeration system while heating water.

It is an object of the present invention to provide a control arrangement for a refrigeration system adapted to condition more than one heat exchange medium in which the control arrangement serves to regulate outside heat exchange coil operation when the system operates to simultaneously condition more than one heat exchange medium.

It is a further object of the present invention to provide a control arrangement for a refrigeration system adapted to condition an enclosure while heating water in which the control arrangement serves to regulate outside heat exchange coil operation during operation of the system to condition the enclosure while heating water.

It is an additional object of the present invention to provide an improved reverse cycle refrigeration system operable to condition an enclosure and to heat water having a control arrangement effective while heating water to maintain predetermined minimum system conditioning operations. Other objects of the invention will be readily perceived from the following description.

The invention relates to a refrigeration system comprising in combination a compressor, a condenser, expansion means, and an evaporator connected in a circuit to provide refrigerant flow therein, a heat exchanger between the compressor and the condenser for bringing secondary medium to be conditioned into heat exchange relation with the refrigerant, means for regulating flow of refrigerant from the condenser in response to refrigerant conditions in the condenser, a conduit connecting a point in the circuit between the compressor and heat exchanger with a point in the circuit between the condenser flow regulating means and expansion means, means for regulating flow of refrigerant through the conduit in response to refrigerant conditions between the condenser flow regulating means and the expansion means, and means for controlling the condenser flow regulating means and conduit regulating means in response to secondary medim conditions.

The invention further relates to a refrigeration system selectively operable to heat and cool comprising in combination a compressor, a first heat exchanger, refrigerant receiving means, first expansion means and a second heat exchanger connected in refrigerant flow relationship, a second expansion means between the refrigerant receiving means and first heat exchanger, reversing means for directing refrigerant flow from the compressor through the second heat exchanger, refrigerant receiving means, second expansion means and first heat exchanger, a third heat exchanger between the compressor and the reversing means for bringing secondary medium to be conditioned into heat exchange relationship with the refrigerant, means for regulating flow of refrigerant from the first heat exchanger in response to refrigerant conditions in the first heat exchanger, a conduit connecting the compressor and the refrigerant receiving means, means for regulating flow of refrigerant through the conduit in response to refrigerant conditions in the receiving means, and means for controlling the first heat exchanger flow regulating means and the conduit flow regulating means in response to secondary medium conditions. Other objects and features of the invention will be apparent from the ensuing specification and drawings, in which FIGURE 1 is a diagrammatic view of the refrigeration system of the present invention;

FIGURE 4 is a wiring diagram of an electric circuit for controlling the modified reverse cycle refrigeration system shown in FIGURE 3.

Figure 1:
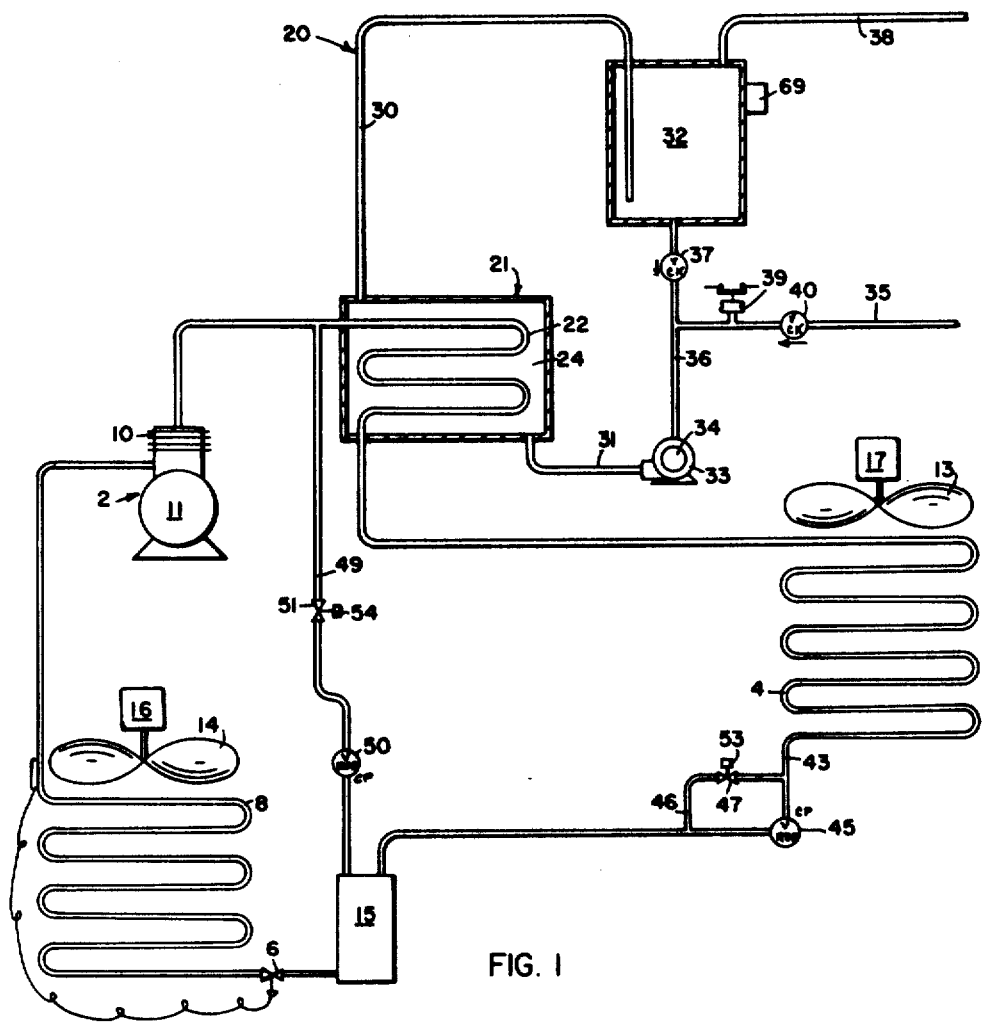

Referring to FIGURE 1 of the drawings, there is shown air conditioning apparatus including a refrigeration system having compression means 2, an outdoor coil 4, refrigerant expansion means 6 and an indoor coil 8 connected in refrigerant flow relationship by suitable conduit means. Compression means 2 comprises a compressor 10 of a suitable type, for example, reciprocating, and a drive motor 11 operably connected thereto. Compressor 10 and motor 11 may be encased in a common housing to form a hermetic unit.

Expansion means 6 may comprise a suitable thermo-expansion valve or if desired, a capillary may be used.

A suitable outdoor coil fan 13 is provided to cause ambient air to flow across outdoor coil 4. Indoor coil fan 14 is provided to cause air to be conditioned to pass into heat exchange relationship with indoor coil 8. The refrigeration system preferably includes a suitable refrigerant receiver 15 connected between outdoor coil 4 and expansion means 6.

A secondary heat exchange circuit 20 is provided for placing a secondary heat exchange medium such as water in heat exchange relationship with hot gaseous refrigerant. Other suitable heat exchange mediums may be contemplated. Secondary heat exchange circuit 20 includes a heat exchanger 21 comprising a heat exchange coil 22 connected to the refrigeration system between the discharge side of compressor 10 and outdoor coil 4, and a shell 24 therefor connected to secondary heat exchange circuit 20 between lines 30 and 31. Line 30 of secondary heat exchange circuit 20 communicates shell 24 with a suitable water storage tank 32. Line 31 connects shell 24 with the discharge side of water circulating pump 33. A suitable drive motor 34 is provided for pump 33. A line 36 connects the input side of water circulating pump 33 with make-up water supply line 35 and water storage tank 32.

Check valve 37 in line 36 prevents the flow of make-up water through line 36 to water storage tank 32. Check valve 37 limits the flow of water therethrough to the direction shown by the solid line arrow in FIGURE 1 of the drawings.

A check valve 40 is preferably provided in make-up water supply line 35 to limit the flow of water therethrough to the direction shown by the solid line arrow in FIGURE 1 of the drawings. Check valve 40 prevents backflow of water from water storage tank 32 into supply line 35. Make-up water supply line 35 includes suitable flow sensing means 39 for detecting the passage of water through line 35 as will be more fully explained hereinafter. Discharge line 38 communicates water storage tank 32 with the area to be supplied. It is understood that the flow of water from storage tank 32 through discharge line 38 is regulated by suitable control valve means (not shown), for example, the tap water faucet.

Refrigerant conduit 43 communicating outdoor coil 4 with refrigerant receiver 15 is provided with a suitable regulating means 45 for controlling operation of outdoor coil 4. Regulating means 45 preferably comprises a pressure responsive valve operable to maintain a predetermined minimum refrigerant condensing pressure in outdoor coil 4. A conduit 46 adapted to bypass outdoor coil regulating means 45 is provided. Bypass conduit 46 is provided with a normally closed control valve 47. Solenoid 53, operatively connected to valve 47, when energized, moves valve 47 to an open position.

A conduit 49 having suitable regulating means 50 and normally closed control valve 51 therein is connected between the discharge side of compressor 10 and refrigerant storage means 15. Solenoid 54, operatively connected to valve 51, when energized, moves valve 51 to an open position whereby refrigerant discharged from compressor 10 may flow through regulating means 50 to refrigerant receiver 15, as will be more particularly explained hereinafter. Regulating means 50 preferably comprises a suitable pressure responsive valve operable to maintain predetermined minimum system pressure at refrigerant storage means 15.

Figure 2:
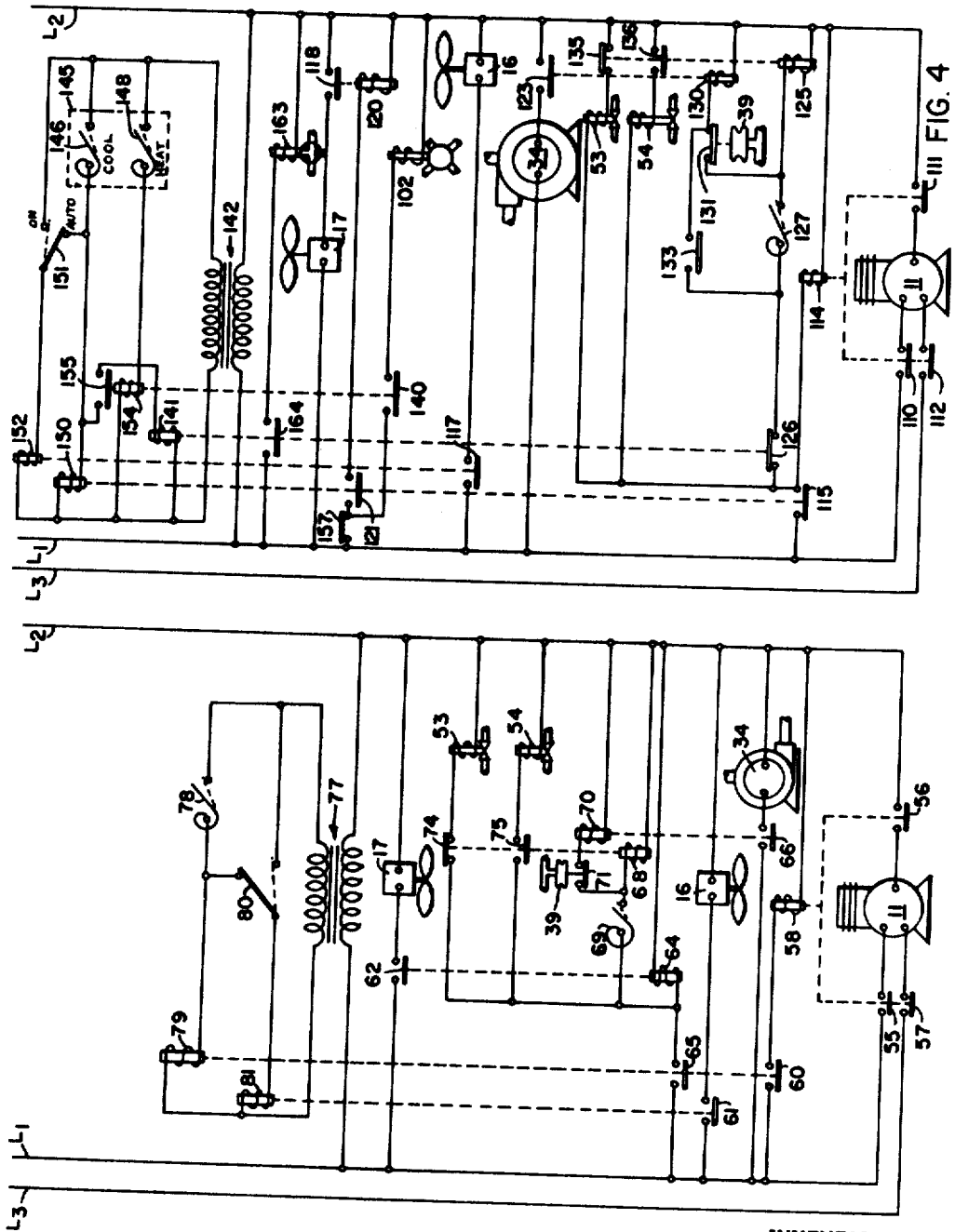
FIGURE 2 is a wiring diagram of an electric circuit for controlling the modified refrigeration system shown in FIGURE 1.

In FIGURE 2 of the drawings, there is shown a control circuit arrangement for the refrigeration system illustrated in FIGURE 1. Referring thereto, a suitable source of alternating current (not shown) is adapted to supply current via leads $L_1$, $L_2$, $L_3$ to a primary control circuit. It is understood that the system may operate on single phase current if suitably modified.

Compressor drive motor 11 is energized when contacts 55, 56, 57 are closed. A contactor coil 58 for closing contacts 55, 56, 57 is provided. Contactor coil 58 is connected in series with switch 60 across leads $L_1$ and $L_2$. Closure of switch 60 in response to a demand for cooling as will be more particularly explained hereinafter completes a circuit from lead $L_1$ through switch 60 to lead $L_2$ to energize contactor coil 58 thereby closing contacts 55, 56, 57 to energize compressor drive motor 11. A suitable timer mechanism (not shown) is preferably provided for regulating energization of the compressor drive motor 11 following closure of switch 60 to thereby limit compressor cycling.

Indoor fan motor 16 is connected in series with indoor fan relay switch 61 across leads $L_1$ and $L_2$. Closure of indoor fan relay switch 61 in a manner to be more fully explained hereinafter completes a circuit from lead $L_1$ through switch 61 to lead $L_2$ to energize the indoor fan motor 16.

Outdoor fan motor 17 is connected in series with outdoor fan relay switch 62 across leads $L_1$ and $L_2$. An outdoor fan relay 64, operable when energized to close outdoor fan relay switch 62 to complete a circuit from lead $L_1$ through switch 62 to lead $L_2$ to energize outdoor fan motor 17, is connected across leads $L_1$ and $L_2$ in series with control relay switch 65. Closure of control relay switch 65 in response to a demand for cooling as will be more fully explained hereinafter completes a circuit from lead $L_1$ through switch 65 to lead $L_2$ to energize outdoor fan relay 64.

Pump motor 34 is connected in series with pump relay switch 66 across leads $L_1$ and $L_2$. Closure of pump relay switch 66 in response to a demand for hot water during operation of the refrigeration system as will be apparent from the ensuing description energizes pump motor 34 to drive pump 33 to circulate water in the secondary heat exchanger circuit 20. An auxiliary control relay 68 is connected in series with control relay switch 65 and water tank thermostat switch 69 across leads $L_1$ and $L_2$. Pump control relay 70 and flow switch 71 are connected in series with water tank thermostat switch 69 and control relay switch 65 across leads $L_1$ and $L_2$. Pump control relay 70, energized upon closure of thermostat switch 69 and control relay switch 65, closes pump relay switch 66 to energize pump motor 34. Flow sensing means 39 in make-up water supply line 35 opens flow switch 71 in response to the flow of water through line 35 into secondary heat exchange circuit 20 to interrupt the circuit to pump control relay 70 as will be more particularly explained hereinafter.

Bypass valve solenoid 53 is connected in series with auxiliary control relay switch 74, normally closed, and control relay switch 65 across leads $L_1$ and $L_2$. Bypass line solenoid 54 is connected in series with auxiliary control relay switch 75 and control relay switch 65 across leads $L_1$ and $L_2$. Energization of auxiliary control relay 68 upon closure of water tank thermostat switch 69 and control relay switch 65 opens auxiliary switch 74 to de-energize bypass valve solenoid 53 and closes switch 75 to energize bypass line solenoid 54 as will be more fully explained hereinafter.

The secondary control circuit may be electrically connected to the primary control circuit by means of transformer 77. Included in the secondary circuit is a thermostat 78 for sensing cooling demands and adapted in response to a predetermined demand for cooling to close. Control relay 79 is connected in series with thermostat 78. Also provided in the secondary control circuit is a fan switch 80 which may be manually moved from the automatic position shown in solid line to the continuous operation position shown in dotted line, and indoor fan relay 81 in series therewith.

Assuming manual fan switch 80 to be in the automatic position as shown in solid line, closure of thermostat 78 in response to a demand for cooling energizes indoor fan relay 81 and control relay 79. Energization of indoor fan relay 81 closes indoor fan relay switch 61 to complete a circuit from lead $L_1$ through switch 61 to lead $L_2$ to energize indoor fan motor 16. Energization of control relay 79 closes control relay switches 60, 65. Closure of control relay switch 65 completes a circuit from lead $L_1$ through switch 65 to lead $L_2$ to energize outdoor fan relay 64. Energization of outdoor fan relay 64 closes outdoor fan relay switch 62 to energize outdoor fan motor 17.

Closure of control relay switch 60 completes a circuit from lead $L_1$ through switch 60 to lead $L_2$ to energize compressor contactor coil 58 to close compressor contacts 55, 56, 57 to energize the compressor drive motor 11. Closure of control relay switch 65 completes a circuit through normally closed auxiliary relay switch 74 to leads $L_1$ and $L_2$ to energize bypass valve solenoid 53 to open bypass line 46.

During system operation, compressor 10 forwards high pressure vaporous refrigerant through secondary heat exchanger means 21 to outdoor heat exchange coil 4. Heat extracted from the refrigerant by the air stream passing over coil 4 under the influence of fan 13 condenses the refrigerant. The condensed refrigerant passes through bypass line 46 to receiver 15. Condensed refrigerant in receiver 15 passes through thermoexpansion valve 6 to indoor heat exchange coil 8 where the refrigerant is vaporized by the stream of air passing thereover under the influence of indoor fan 14. Vaporous refrigerant in indoor heat exchange coil 8 returns to the suction side of compressor 10. It is understood that line 49 between the compressor discharge side and receiver 15 is interrupted by normally closed valve 51.

Circulating pump 33 in secondary heat exchange circuit 20 is inoperative. With water storage tank 32 assumed to be filled, there is no flow of water in secondary heat exchange circuit 20.

Should the temperature of water in tank 32 fall below a predetermined minimum, thermostat switch 69 closes to complete a circuit from lead $L_1$ through control relay switch 65 and thermostat switch 69 to lead $L_2$ to energize auxiliary control relay 68. Energization of auxiliary control relay 68 closes auxiliary control relay switch 75 to complete a circuit from lead $L_1$ through control relay switch 65 and switch 75 to lead $L_2$ to energize solenoid 54. Energization of solenoid 54 opens valve 51 to place the compressor discharge side in communication with receiver 15 through line 49 and pressure responsive valve 50. Energization of auxiliary control relay 68 opens normally closed auxiliary relay switch 74 to deenergize bypass valve solenoid 53 thereby permitting bypass valve 47 to close and interrupt bypass line 46.

With water storage tank 32 filled, and assuming there to be no discharge of water from tank 32 through line 38 in response to a demand for hot water, flow switch 71 is closed. Accordingly, closure of water tank thermostat switch 69 completes a circuit from lead $L_1$ through control relay switch 65, switch 69, and flow switch 71 to lead $L_2$ to energize pump control relay 70. Energization of pump control relay 70 closes pump control relay switch 66 to complete a circuit from lead $L_1$ through switch 66 to lead $L_2$ to energize pump motor 34.

Pump 33 circulates water to be heated from storage tank 32 through line 36 and check valve 37, line 31, heat exchanger shell 24 and line 30 to storage tank 32.

Heat extracted from the relatively hot high pressure refrigerant vapor discharged from compressor 10 through coil 22 of heat exchanger 21 by the water circulating in secondary circuit 20 condenses the refrigerant. The refrigerant passes to outdoor coil 4. Liquid refrigerant leaving coil 4 passes through pressure responsive valve 45, bypass line 46 being interrupted by valve 47. Pressure responsive valve 45 opens to the flow of liquid refrigerant from outdoor coil 4 at or above a predetermined pressure to maintain a predetermined minimum outdoor heat exchange coil operating condition. Liquid refrigerant flowing through pressure responsive valve 45 passes to receiver 15 and thereafter through thermoexpansion valve 6 and outdoor coil 8 to compressor 10 in the manner described heretofore.

Should pressure in refrigerant receiver 15 fall below a predetermined minimum, pressure responsive valve 50 opens to permit relatively high pressure vaporous refrigerant from compressor 10 to pass through line 49 to receiver 15 to maintain a predetermined minimum system operating condition. By this arrangement, pressure at receiver 15 may be held at a sufficient level to insure passage of liquid refrigerant from the receiver 15 through thermoexpansion valve 6 and indoor coil 8 to compressor 10.

Upon a demand for hot water, water in storage tank 32 discharges through line 38. Make-up water flows through supply line 35 and check valve 40 into the secondary heat exchange circuit 20 to replenish water discharged from tank 32. Flow sensing means 39 opens flow switch 71 in response to the flow of water through supply line 35 to interrupt the energizing circuit for relay 70 to open switch 66 and deenergize pump motor 34. Make-up water from supply line 35 passes through pump 33 and line 31 to heat exchanger means 21 wherein the make-up water is heated. Relatively warm water from heat exchanger means 21 passes through line 30 into storage tank 32.

Figure 3:
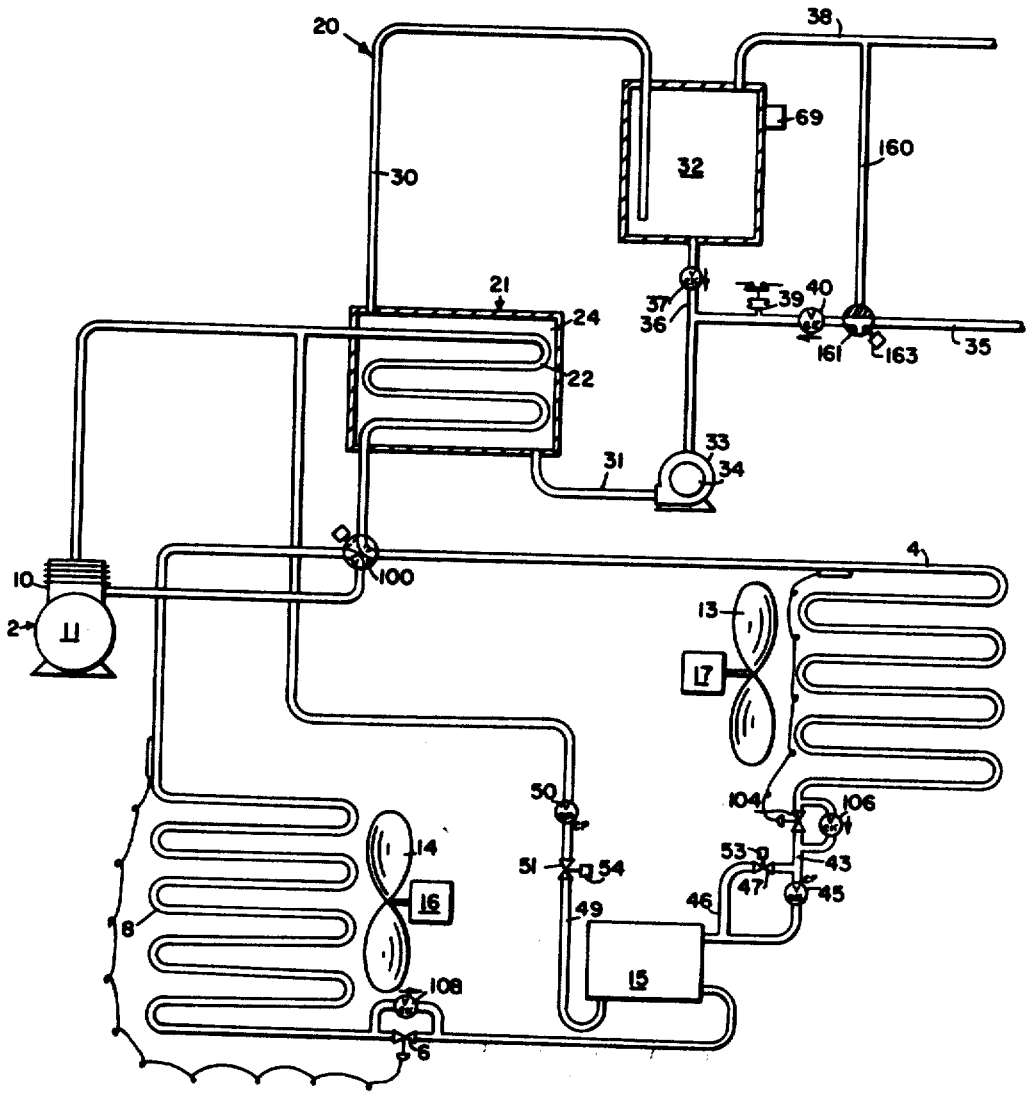
FIGURE 3 is a diagrammatic view of a reverse cycle refrigeration system according to this invention.

Referring to FIGURE 3 of the drawings wherein like numerals designate like parts, there is shown an air conditioning apparatus of the reverse cycle type, commonly known as a heat pump, embodying applicants' unique water heating arrangement. In addition to the refrigeration system elements heretofore described in connection with the system illustrated in FIGURE 1 of the drawings, the reverse cycle system of the drawings incorporates a suitable reversing mechanism 100, preferably a four-way reversing valve, for the purpose of reversing refrigerant flow through a portion of the system in order to obtain the desired heating and cooling effects in a manner to be more fully described hereinafter.

Reversing valve 100, when in the solid line position, forwards relatively high pressure gaseous refrigerant from compressor 10 to outdoor heat exchange coil 4 while relatively low pressure gaseous refrigerant from indoor heat exchange coil 8 is returned through reversing valve 100 to the compressor suction side. The system accordingly operates on the cooling cycle.

Actuation of reversing valve control solenoid 102 places reversing valve 100 in the position shown in dotted lines whereby relatively high pressure gaseous refrigerant discharged from compressor 10 is forwarded through indoor heat exchange coil 8 while relatively low pressure gaseous refrigerant from outdoor heat exchange coil 4 passes through reversing valve 100 to the compressor suction side. The system accordingly operates on the heating cycle.

A suitable thermoexpansion valve 104 having check valve controlled bypass 106 therearound is disposed in line 43 between outdoor heat exchange coil 4 and outdoor heat exchange coil pressure responsive valve 45. Check valve controlled bypass 106 is adapted to permit flow of refrigerant in the direction shown by the solid line arrow. During cooling cycle operation, with reversing valve 100 disposed in the solid line position, the relatively high pressure vaporous refrigerant discharged from compressor 10 flows through outdoor heat exchange coil 4 and check valve controlled bypass 106 to refrigerant receiver 15. Refrigerant flows from receiver 15 through thermoexpansion valve 6, indoor heat exchange coil 8, and reversing valve 100 to the compressor suction side.

A suitable check valve controlled bypass 108 is provided across thermoexpansion valve 6 operable to permit flow of refrigerant in the direction shown by solid line arrow around expansion valve 6 during heating cycle operation. With reversing valve 100 in the dotted line position whereby the system operates on the heating cycle, relatively high pressure gaseous refrigerant discharged from compressor 10 passes through indoor heat exchange coil 8 and check valve controlled bypass 108 to refrigerant receiver 15. Refrigerant passes from receiver 15 through thermoexpansion valve 104, check valve controlled bypass 106 being closed to the flow of refrigerant, to outdoor heat exchange coil 4. Refrigerant in outdoor heat exchange coil 4 returns through reversing valve 100 to the compressor suction side.

Secondary heat exchange circuit 20 is preferably provided with a suitable bypass line 160 between make-up water supply line 35 and discharge line 38. Control valve 161, when in the position shown in solid lines, interrupts bypass line 160. Solenoid 163, when energized in a manner to be more fully explained hereinafter, moves control valve 161 to the position shown in dotted line to interrupt communication between supply line 35 and secondary heat exchange circuit 20 and open bypass line 160 to communicate supply line 35 directly with discharge line 38.

In FIGURE 4 of the drawings wherein like numerals refer to like parts, there is shown a control circuit arrangement for the reverse cycle refrigeration system illustrated in FIGURE 3 of the drawings.

Compressor drive motor 11 is energized from a suitable source of alternating current (not shown) through leads $L_1$, $L_2$, $L_3$ upon closure of contacts 110, 111, 112 respectively on energization of contactor coil 114. Contactor coil 114 is connected in series with control relay switch 115 across leads $L_1$ and $L_2$. Closure of switch 115, in response to a demand for cooling or heating, as will be more particularly explained hereinafter, completes a circuit from lead $L_1$ through switch 115 to lead $L_2$ to energize contactor coil 114 to close contacts 110, 111, 112 to energize the compressor drive motor 11.

Indoor fan motor 16 is connected in series with indoor fan relay switch 117 across leads $L_1$ and $L_2$. Outdoor fan motor 17 is connected in series with outdoor fan relay switch 118 across leads $L_1$ and $L_2$. Outdoor fan relay 120, operable when energized to close outdoor fan relay switch 118 to energize outdoor fan motor 17, is connected across leads $L_1$ and $L_2$ in series with control relay switch 121 and defrost control switch 157, normally closed. Closure of control relay switch 121 in response to a demand for cooling or heating, as will be more fully explained hereinafter, completes a circuit from lead $L_1$ through defrost control switch 157 and switch 121 to lead $L_2$ to energize outdoor fan relay 120.

Pump motor 34 is connected in series with pump relay switch 123 across leads $L_1$ and $L_2$. Closure of pump relay switch 123 energizes pump motor 34 to drive pump 33 and circulate water in the secondary heat exchanger circuit 20.

An auxiliary control relay 125 is connected in series with control relay switch 115, normally closed auxiliary reversing relay contact 126, and water tank thermostat switch 127 across leads $L_1$ and $L_2$. Pump control relay 130 and normally closed flow responsive switch 131 are connected in series with water tank thermostat switch 127, normally closed auxiliary reversing relay contact 126, and control relay switch 115 across leads $L_1$ and $L_2$. Pump control relay 130, when energized upon closure of thermostat 127 and control relay switch 115, closes pump relay switch 123 to energize pump motor 34. A manually controlled switch 133 may be provided in series with pump control relay 130, auxiliary reversing relay contact 126, control relay switch 115 across leads $L_1$ and $L_2$. Closure of switch 133 bypasses thermostat switch 127 and flow switch 131 to energize pump control relay 130 directly and operate pump 33 independently of water temperature conditions in storage tank 32 and water supply conditions in line 35.

Bypass valve solenoid 53 is connected in series with auxiliary control relay switch 135, normally closed, and control relay switch 115 across leads $L_1$ and $L_2$. Bypass line solenoid 54 is connected in series with auxiliary control relay switch 136 and control relay switch 115 across leads $L_1$ and $L_2$. Energization of auxiliary control relay 125 upon closure of water tank thermostat switch 127 and control relay switch 115 opens auxiliary control relay switch 135 to deenergize bypass valve solenoid 53 and closes auxiliary control switch 136 to energize bypass line solenoid 54.

Reversing valve control solenoid 102 is connected in series with reversing valve relay switch 140 and defrost control switch 157 across leads $L_1$ and $L_2$. Bypass valve solenoid 163 is connected in series with reversing valve relay contact 164 across leads $L_1$ and $L_2$.

The secondary control circuit may be electrically connected to the primary control circuit my means of transformer 142. Included in the secondary circuit is a room thermostat 145 comprising cooling thermostat 146 and heating thermostat 148. Control relay 150 is connected in series with cooling thermostat 146. Also provided in the secondary control circuit is a fan switch 151 which may be manually moved from the automatic position shown in solid line to the continuous operating position shown in dotted line and indoor fan relay 152 in series therewith. Reversing valve relay 154 is connected in series with heating thermostat 148. Reversing valve relay contact 155 is connected in series with control relay 150 and heating thermostat 148. Auxiliary reversing relay 141 is connected in series with heating thermostat 148.

Energization of auxiliary reversing relay 141 on closure of thermostat 148 opens normally closed auxiliary reversing relay contact 126 to terminate operation of the auxiliary water heating mechanism on the heating cycle in a manner to be described hereinafter. It is understood that auxiliary reversing relay 141 and auxiliary reversing relay contact 126 may be omitted where it is desired to heat water during both cooling and heating cycle operations.

During cooling operation, cooling thermostat 146 of the room thermostat 145 will close in response to a demand for cooling. Assuming manually operated fan switch 151 to be in the automatic position as shown in solid line, indoor fan relay 152 is energized to close indoor fan contact 117 and energize indoor fan motor 16. Additionally, closure of cooling thermostat 146 energizes control relay 150. Energization of control relay 150 closes control relay switches 115 and 121 to energize compressor contactor coil 114 and outdoor fan relay 120 respectively. Enerization of compressor contactor coil 114 closes compressor contacts 110, 111, 112 to energize compressor motor 11. Energization of outdoor fan relay 120 closes outdoor fan relay switch 118 to complete a circuit from lead $L_1$ through switch 118 to lead $L_2$ to energize outdoor fan motor 17. Closure of control relay switch 115 completes a circuit through normally closed auxiliary relay contact 135 to energize bypass valve solenoid 53 to open refrigeration system bypass line 46.

During cooling cycle operation, compressor 10 forwards high pressure vaporized refrigerant through reversing valve 100 to outdoor heat exchange coil 4. Heat is extracted from the refrigerant by the air stream passing over coil 4 under the influence of fan 13 to condense the refrigerant. Condensed refrigerant passes through check valve controlled bypass 106 and bypass line 46 to receiver 15. Condensed refrigerant in receiver 15 passes through thermoexpansion valve 6, the check valve controlled bypass 108 being closed to the flow of refrigerant in the direction opposite to that shown by the solid line arrow, to indoor heat exchange coil 8. Air to be conditioned is brought into heat exchange relationship with indoor coil 8 by fan 14 vaporizing refrigerant in coil 8. The vaporized refrigerant returns to the suction side of compressor 10 through reversing valve 100. It is understood that bypass line 49 between the compressor discharge side and receiver 15 is interrupted by valve 51.

Circulating pump 33 in secondary heat exchange circuit is inoperative. With storage tank 32 assumed filled, there is no flow of water in secondary heat exchange circuit 20. If desired, manual bypass switch 133 may be closed to complete a circuit through control relay switch 115, auxiliary reversing relay contact 126 and switch 133 to energize pump control relay 130. Pump control relay 130 closes pump control contact 123 to energize pump motor 34 to drive pump 33 to circulate water in secondary heat exchange circuit 20.

If, during cooling cycle operation, water tank thermostat switch 127 should close, a circuit is completed through control relay contact 115, auxiliary reversing relay contact 126, and thermostat switch 127 to energize auxiliary control relay 125. With water storage tank 32 filled and assuming there to be no discharge of water from tank 32 through line 38 in response to a demand for hot water, flow switch 131 is closed. Accordingly, closure of water tank thermostatswitch 127 completes a circuit from lead $L_1$ through control relay contact 115, auxiliary reversing relay contact 126, thermostat switch 127 and flow switch tank thermostat switch 127 completes a circuit from lead 131 to lead $L_2$ to energize pump control relay 130. Energization of pump control relay 130 closes pump control relay switch 123 to complete a circuit from lead $L_1$ through switch 123 to lead $L_2$ to energize pump motor 34.

Energization of auxiliary control relay 125 closes auxiliary control relay switch 136 to complete a circuit from lead $L_1$ through control relay switch 115 and switch 136 to lead $L_2$ to energize solenoid 54. Energization of solenoid 54 opens valve 51 to place the compressor discharge side in communication with receiver 15 through line 49 under the regulation of pressure responsive control valve 50. Energization of auxiliary control relay 125 opens normally closed switch 135 to interrupt the circuit to bypass valve solenoid 53 to permit bypass valve 47 to close interrupting bypass line 46.

Pump 33 circulates water to be heated from storage tank 32 through line 36 and check valve 37, line 31, heat exchanger shell 24 and line 30 to storage tank 32 from whence the relatively warm water may be drawn as required through discharge line 38.

Upon a demand for hot water, water in storage tank 32 discharges through line 38. Make-up water flows through line 35 and check valve 40 into the secondary heat exchange circuit 20 to replenish water discharged from tank 32. Flow sensing means 39 opens flow switch 131 in response to the flow of water through supply line 35 to interrupt the energizing circuit of relay 130 and open switch 123 to deenergize pump motor 34. Make-up water from supply line 35 flows through pump 33, now inoperative, and line 31 to heat exchange 21 wherein the make-up water is heated. Relatively warm water from heat exchanger 21 passes through line 30 to storage tank 32.

Heat extracted from the relatively hot high pressure refrigerant vapor discharged from compressor 10 through coil 22 of heat exchanger 21 by the water circulating in secondary circuit 20 condenses the refrigerant. The refrigerant passes to outdoor coil 4. Liquid refrigerant leaving coil 4 passes through check valve controlled bypass 106 and control valve 45, the bypass line 46 being interrupted by valve 49. Control valve 45 opens to the flow of liquid refrigerant from outdoor coil 4 at or above a predetermined pressure to maintain a predetermined minimum outdoor heat exchange coil operating condition. Liquid refrigerant flowing from control valve 45 passes to receiver 15 and thereafter through thermoexpansion valve 6, outdoor coil 8 and reversing valve 100 to compressor 10 in the manner described heretofore.

Should pressure in refrigerant receiver 15 fall below a predetermined minimum, control valve 50 opens to communicate the compressor discharge side directly with receiver 15 through the line 49. Relatively high pressure vaporous refrigerant from compressor 10 is passed through line 49 by control valve 50 to receiver 15 to maintain a predetermined minimum system operating condition. By this arrangement, pressure at receiver 15 may be held at a sufficient level to insure passage of liquid refrigerant from the receiver 15 through thermoexpansion valve 6 and indoor coil 8 to compressor 10.

Operation of the system on the heating cycle is initiated by closure of heating thermostat 148 of room thermostat 145 to energize reversing valve relay 154 and auxiliary reversing relay 141. Energization of reversing valve relay 154 closes reversing valve relay switches 140 and 155. Closure of reversing valve switch 155 energizes control relay 150 and indoor fan relay 152. Energization of control relay 150 closes switches 115 and 121 to energize the compressor 10 and outdoor fan motor in the manner described heretofore. Energization of indoor fan relay 152 closes indoor fan relay switch 117 to energize indoor fan motor 16. Closure of control relay switch 115 completes a circuit through normally closed auxiliary relay switch 135 to energize solenoid 53 to open bypass line valve 47.

Closure of reversing valve relay switch 140 completes a circuit from lead $L_1$ through defrost control switch 157 and switch 140 to lead $L_2$ to energize reversing valve solenoid 102. Energization of reversing valve solenoid 102 moves reversing valve 100 to the heating cycle position illustrated by dotted lines in the drawings.

Energization of auxiliary reversing relay 141 opens auxiliary reversing relay contact 126 to prevent energization of auxiliary control relay 125 and pump control relay 130 with consequent operation of the water heating system. Additionally, auxiliary reversing relay 141 closes auxiliary reversing relay switch 164 to energize solenoid 163 to move control valve 161 to the dotted line position to interrupt communication between make-up water supply line 35 and secondary heat exchange circuit 20 while opening bypass line 160 to communicate supply line 35 directly with discharge line 38.

During heating cycle operation, relatively high pressure vaporous refrigerant discharged from compressor 10 flows through reversing valve 100 to indoor coil 8 wherein heat is extracted from the refrigerant by the stream of air passing over coil 8 under the influence of indoor fan 14 to condense the refrigerant. Condensed refrigerant passes through check valve controlled bypass 108 to refrigerant receiver 15. Liquid refrigerant in receiver 15 passes through bypass line 46 and thermoexpansion valve 104 to outdoor heat exchange coil 4 wherein ambient air under the influence of outdoor fan 13 is brought into heat exchange relationship with outdoor coil 4 to vaporize refrigerant therein. Refrigerant in outdoor coil 4 passes through reversing valve 100 to the suction side of compressor 10.

During operation of the reverse cycle refrigeration system shown in FIGURE 3 of the drawings on the heating cycle, frost and/or ice may accumulate on outdoor heat exchange coil 4. To remove accumulated frost and/or ice from coil 4, the system may be temporarily reverted to cooling cycle operation. To initiate the system defrost cycle, defrost control switch 157 is opened by suitable means (not shown) to interrupt the energizing circuit to reversing valve solenoid 102 to cause reversing valve 100 to assume the position shown in solid lines on the drawing whereby relatively hot vapors refrigerant discharged from compressor 10 is passed to outdoor coil 4 to melt frost and/or ice thereon. At the completion of the defrost cycle, switch 157 closes and the system reverts to heating cycle operation.

While we have described a preferred embodiment of the invention, it will be understood that the invention is not limited thereto, since it may be otherwise embodied in the scope of the following claims.

We claim:

1. In a refrigeration system including a compressor, a condenser, expansion means, and an evaporator connected in a circuit to provide refrigerant flow therein, the combination of a heat exchanger between said compressor and said condenser for bringing secondary medium to be conditioned into heat exchange relationship with the refrigerant, means for regulating flow of refrigerant from said condenser in response to refrigerant conditions in said condenser, a conduit connecting a point in the circuit between said compressor and said heat exchanger with a point in the circuit between said condenser flow regulating means and said expansion means, means for regulating flow of refrigerant through said conduit in response to refrigerant conditions between the condenser flow regulating means and said expansion means, and means for controlling said condenser flow regulating means and said conduit flow regulating means in response to secondary medium conditions.

2. A refrigeration system according to claim 1 including means to render said condenser flow regulating means ineffective, said control means serving to actuate said last mentioned means in response to a predetermined secondary medium condition.

3. A refrigeration system according to claim 2 including valve means to interrupt said conduit, said control means serving to actuate said valve means in response to said predetermined secondary medium condition.

4. In a refrigeration system including a compressor, a condenser, expansion means and an evaporator connected in refrigerant flow relationship, the combination of a heat exchanger between said compressor and said condenser, means communicating said heat exchanger with a supply of water to be conditioned, first refrigerant control means to regulate flow of refrigerant from said condenser to said expansion means to maintain a predetermined minimum refrigerant condition in said condenser, a conduit for bypassing said condenser and said first refrigerant control means, second refrigerant control means to regulate flow of refrigerant through said conduit to maintain a predetermined minimum refrigerant condition between said first refrigerant control means and said expansion means, and means operable in response to a predetermined water temperature to actuate said first and said second refrigerant control means.

5. A control arrangement for a refrigeration-water heating apparatus including a compressor having a drive motor, an outdoor coil, pressure regulating means for said outdoor coil, expansion means and an indoor coil connected to form a circuit for refrigerant flow, first bypass means to bypass the pressure regulating means, second bypass means including pressure regulating means to bypass the outdoor coil, and means for bringing water into heat exchange relation with refrigerant flowing between the compressor and the outdoor coil, comprising in combination first switch means to complete an energizing circuit to said drive motor, second switch means to complete an energizing circuit to said first bypass means, means for actuating said first and second switch means in response to a demand for refrigeration, third switch means to complete an energizing circuit to said second bypass means, fourth switch means to interrupt the energizing circuit to said first bypass means, and means operable in response to a predetermined condition of said water to actuate said third and fourth switch means.

6. A control arrangement according to claim 5 in which said second switch means is series connected with said third switch means whereby actuation of said second switch means readies said second bypass means for energization.

7. A control arrangement according to claim 6 in which said means for bringing water into heat exchange relation with the refrigerant includes a pump having a drive motor, fifth switch means to complete an energizing circuit to said pump motor, said water condition responsive means actuating said fifth switch means in response to said predetermined water condition.

8. A control arrangement according to claim 7 in which said means for bringing water into heat exchange relation with the refrigerant includes a conduit in communication with a source of make-up water, means for sensing flow of make-up water through said conduit, and sixth switch means to interrupt the energizing circuit to said pump motor, said flow sensing means actuating said sixth switch means in response to flow of make-up water through said conduit.

9. In a refrigeration system selectively operable to heat and cool including a compressor, a first heat exchanger, refrigerant receiving means, first expansion means and a second heat exchanger connected in refrigerant flow relationship, second expansion means btween the refrigerant receiving means and the first heat exchanger, and reversing means for directing refrigerant flow from the compressor through the second heat exchanger, refrigerant receiving means, second expansion means and first heat exchanger, the combination of a third heat exchanger between said compressor and said reversing means for bringing secondary medium to be conditioned into heat exchange relationship with the refrigerant, means to regulate flow of refrigerant from said first heat exchanger in response to refrigerant conditions in said first heat exchanger, a conduit connecting said compressor and said refrigerant receiving means, means to regulate flow of refrigerant through said conduit in response to refrigerant conditions in said refrigerant receiving means, and control means for actuating said first heat exchanger regulating means and said conduit regulating means in response to secondary medium conditions.

10. A refrigeration system according to claim 9 including bypass means to render said first heat exchanger regulating means ineffective, said control means actuating said bypass means in response to a predetermined secondary medium condition.

11. A refrigeration system according to claim 10 including valve means for said conduit, said control means serving to actuate said valve means to interrupt said conduit in response to said predetermined secondary medium condition.

12. A control arrangement for a reverse cycle refrigeration-water heating apparatus including a compressor having a drive motor, reversing means, an outdoor coil, pressure regulating means for said outdoor coil, expansion means, and an indoor coil connected to form a circuit for refrigerant flow during cooling operation, the reversing means serving to direct the flow of refrigerant through the indoor coil, expansion means, and outdoor coil during heating operation, first bypass means to bypass the pressure regulating means, second bypass means including pressure regulating means to bypass the outdoor coil, and means for placing water in heat exchange relation with refrigerant between the compressor and the reversing means, the combination of first switch means to complete an energizing circuit to said compressor drive motor and said first bypass means, control means for actuating said first switch means in response to a predetermined demand for cooling, second switch means to complete an energizing circuit to said second bypass means, third switch means to interrupt the energizing circuit to said first bypass means, and means operable in response to a predetermined condition of said water to actuate said second and third switch means.

13. The control arrangement according to claim 12 in which said first switch means is series connected with said second switch means.

14. The control arrangement according to claim 13 in which said means for placing water in heat exchange relation with refrigerant includes a pump having a drive motor, fourth switch means to complete an energizing circuit to said pump motor, said water condition responsive means actuating said fourth switch means in response to said predetermined water condition.

15. The control arrangement according to claim 14 in which said means for placing water in heat exchange relation with refrigerant includes a conduit in communication with a source of make-up water, means for sensing flow of make-up water through said conduit, and fifth switch means to interrupt the energizing circuit to said pump motor, said flow sensing means actuating said fifth switch means in response to flow of make-up water through said conduit.

16. The control arrangement according to claim 15 including sixth switch means to complete an energizing circuit to said reversing means, seventh switch means to interrupt the energizing circuit to said second bypass said sixth and seventh switch means in response to a predetermined demand for heat.

References Cited by the Examiner
UNITED STATES PATENTS

| | | | |
|---|---|---|---|
| 2,241,070 | 5/41 | McLenegan | 62—160 |
| 2,575,325 | 11/51 | Ambrose | 62—238 |
| 2,619,326 | 11/52 | McLenegan | 62—160 |
| 2,751,761 | 6/56 | Borgerd | 62—160 |
| 3,017,162 | 1/62 | Haines | 62—238 |

WILLIAM J. WYE, *Primary Examiner.*

ROBERT A. O'LEARY, *Examiner.*

UNITED STATES PATENT OFFICE
CERTIFICATE OF CORRECTION

Patent No. 3,188,829                                      June 15, 1965

Herbert G. Siewert et al.

It is hereby certified that error appears in the above numbered patent requiring correction and that the said Letters Patent should read as corrected below.

Column 2, line 16, after "conduit" insert -- flow --; line 17, for "medim" read -- medium --; column 8, line 14, for "my" read -- by --; column 9, line 22, strike out "tank thermostat switch 127 completes a circuit from lead"; line 52, for "exchange" read -- exchanger --; column 13, line 10, after "bypass" insert -- means and said pump motor, said control means actuating --.

Signed and sealed this 18th day of January 1966.

(SEAL)
Attest:

ERNEST W. SWIDER                                EDWARD J. BRENNER
Attesting Officer                                   Commissioner of Patents